United States Patent [19]
Takada et al.

[11] Patent Number: 6,012,899
[45] Date of Patent: Jan. 11, 2000

[54] STATOR OF A TORQUE CONVERTER

[75] Inventors: Yukiyoshi Takada; Takeyuki Nakamura, both of Neyagawa, Japan

[73] Assignee: Exedy Corporation, Neyagawa, Japan

[21] Appl. No.: 09/065,451

[22] Filed: Apr. 24, 1998

[30] Foreign Application Priority Data

Apr. 25, 1997 [JP] Japan .................................. 9-108493

[51] Int. Cl.$^7$ ..................................................... F01D 1/02
[52] U.S. Cl. .................. 415/191; 415/208.1; 415/208.2; 415/211.2; 60/362
[58] Field of Search ..................................... 415/191, 186, 415/188, 208.1, 208.2, 210.1, 211.2, 200, 208.3, 208.5, 211.1; 416/197 C, 180; 60/361, 362

[56] References Cited

U.S. PATENT DOCUMENTS

| | | |
|---|---|---|
| 3,125,857 | 3/1964 | Schneider . |
| 4,867,290 | 9/1989 | Macdonald et al. .................... 192/3.28 |
| 5,313,793 | 5/1994 | Kirkwood et al. . |
| 5,586,434 | 12/1996 | Okubo et al. .............................. 60/345 |
| 5,779,014 | 7/1998 | Kinoshita et al. ..................... 194/41 R |

FOREIGN PATENT DOCUMENTS 3531521  3/1987  Germany .

Primary Examiner—Edward K. Look
Assistant Examiner—Ninh Nguyen
Attorney, Agent, or Firm—Shinjyu An Intellectual Property Firm

[57] ABSTRACT

A stator 6 includes an annular inner shell 11, an annular outer shell 12 and blades 13. The outer shell 12 is arranged radially outside the inner shell 11. The blades 13 are formed between the inner shell 11 and the outer shell 12, and are arranged at a plurality of circumferentially aligned positions, respectively. Each blade 13 extends from the inner shell 11 to the outer shell 12 and thereby couples the outer peripheral portion of the inner shell 11 and the inner peripheral portion of the outer shell 12 together. A rate of change in cross sectional area of the blade changes at a position located radially outside the inner shell 11 at a distance in a range from ⅙ to ½ of a distance (r2–r1) between the outer peripheral portion of the inner shell 11 and the inner peripheral portion of the outer shell 12.

19 Claims, 2 Drawing Sheets

STATOR OF A TORQUE CONVERTER

BACKGROUND OF THE INVENTION

A. Field of the Invention

The invention relates to a stator of a torque converter, and particularly a stator of a torque converter having thin blades.

B. Description of the Background Art

A torque converter typically includes an impeller, a turbine and a stator, and is operable to transmit torque via a working fluid that fills an interior thereof. The working fluid operates for transmitting torque in a radially outer region of the torque converter flowing from the impeller to the turbine, and then flows from the turbine to the stator, and subsequently flows back to the impeller.

The stator is disposed between the impeller and the turbine in a radially inward portion of the torque converter. The stator is usually supported on a one way clutch mechanism. The one way clutch mechanism is typically supported on a stator shaft that is fixed to a transmission housing. The stator is usually made of a casting of resin or aluminum alloy or other metal materials, and is basically formed of an annular outer shell, an annular inner shell and blades disposed between the outer shell and inner shell.

The blades of the stator are arranged at a plurality of circumferentially spaced apart, aligned positions, respectively, and each blade extends from the radially inner shell to the radially outer shell for controlling a direction of the working fluid returning from the turbine to the impeller. The blades are shaped such that the sectional area of each blade changes at a substantially constant rate through its entire radial length, except for a portion which will hereafter be referred to as a "corner portion". The corner portion forms a boundary region between the blade and the shell. Typically the blade and the corner portion are formed integrally with each other by the casting methods mentioned above. The outer surfaces of the blades are arcuately shaped.

For improving a torque transmission efficiency of the torque converter, it is necessary to provide an optimum fluid performance at the stator in accordance with the forms of the impeller and stator. For this, it is generally desirable to minimize a thickness of the blade of the stator in order to optimize the performance of the stator within a wide range.

Although reduction in thickness of the blade is desired for improving the performance, increase in thickness thereof is required in order to insure the structural strength of the blades.

SUMMARY OF THE INVENTION

One object of the invention is to reduce the thickness of the blade while maintaining an intended strength, and thereby improve the performance of the stator of the torque converter and therefore the performance of the torque converter.

In accordance with one embodiment of the present invention, a stator of a torque converter includes an annular inner shell and an annular outer shell disposed radially outside the inner shell. A plurality of blades extend between the outer shell and the inner shell. The blades are disposed about the inner shell at a circumferentially spaced apart positions. The blades couple an outer peripheral portion of the inner shell and an inner peripheral portion of the outer shell together. Each of the blades are formed with an inner portion and an outer portion in a radial direction relative to the inner shell and the outer shell. A rate of change in the cross sectional area of the inner and outer portions is such that the rate of change in the cross sectional area of the inner portion differs from the rate of change in the cross sectional of the outer portion. A boundary between the inner portion and the outer portion is defined at a radial position relative to the outer peripheral portion of the inner shell by a distance that is in a range of from $\frac{1}{6}$ to $\frac{1}{2}$ of a distance between the outer peripheral portion of the inner shell and the inner peripheral portion of the outer shell. The cross sectional area of the inner portion of each of the blades proximate the outer peripheral portion of the inner shell is larger than the cross sectional area of the outer portion of the blades proximate the boundary.

Preferably, the boundary is at a position between the inner portion and the outer portion at a radial position relative to the outer peripheral portion of the inner shell by a distance that is $\frac{1}{3}$ the distance between the outer peripheral portion of the inner shell and the inner peripheral portion of the outer shell.

Alternatively, the boundary is at a position between the inner portion and the outer portion at a radial position relative to the outer peripheral portion of the inner shell by a distance that is $\frac{1}{4}$ the distance between the outer peripheral portion of the inner shell and the inner peripheral portion of the outer shell.

Preferably, the cross sectional area of the outer portion of the blades is generally constant throughout a radial length thereof.

Alternatively, the cross sectional area of the outer portion of the blades decreases gradually going from the boundary toward the outer shell.

Further, the cross sectional area of the inner portion of the blades at the boundary is generally the same as the cross sectional area of the outer portion at the boundary.

By the above embodiments of the present invention, the stator of the torque converter is provided with blades that are thin enough to provide desired performance characteristics, but are thick enough to provide required structural strength characteristics.

In order to satisfy the requirements contrary to each other, the blade has a thin structure at a region adjacent to the outer shell and thickness at a region adjacent to the inner shell.

The foregoing and other objects, features, aspects and advantages of the present invention will become more apparent when considered in conjunction with the accompanying drawings in which like reference numerals represent like elements throughout the various drawings.

DESCRIPTION OF THE PREFERRED EMBODIMENTS

Figure 1:
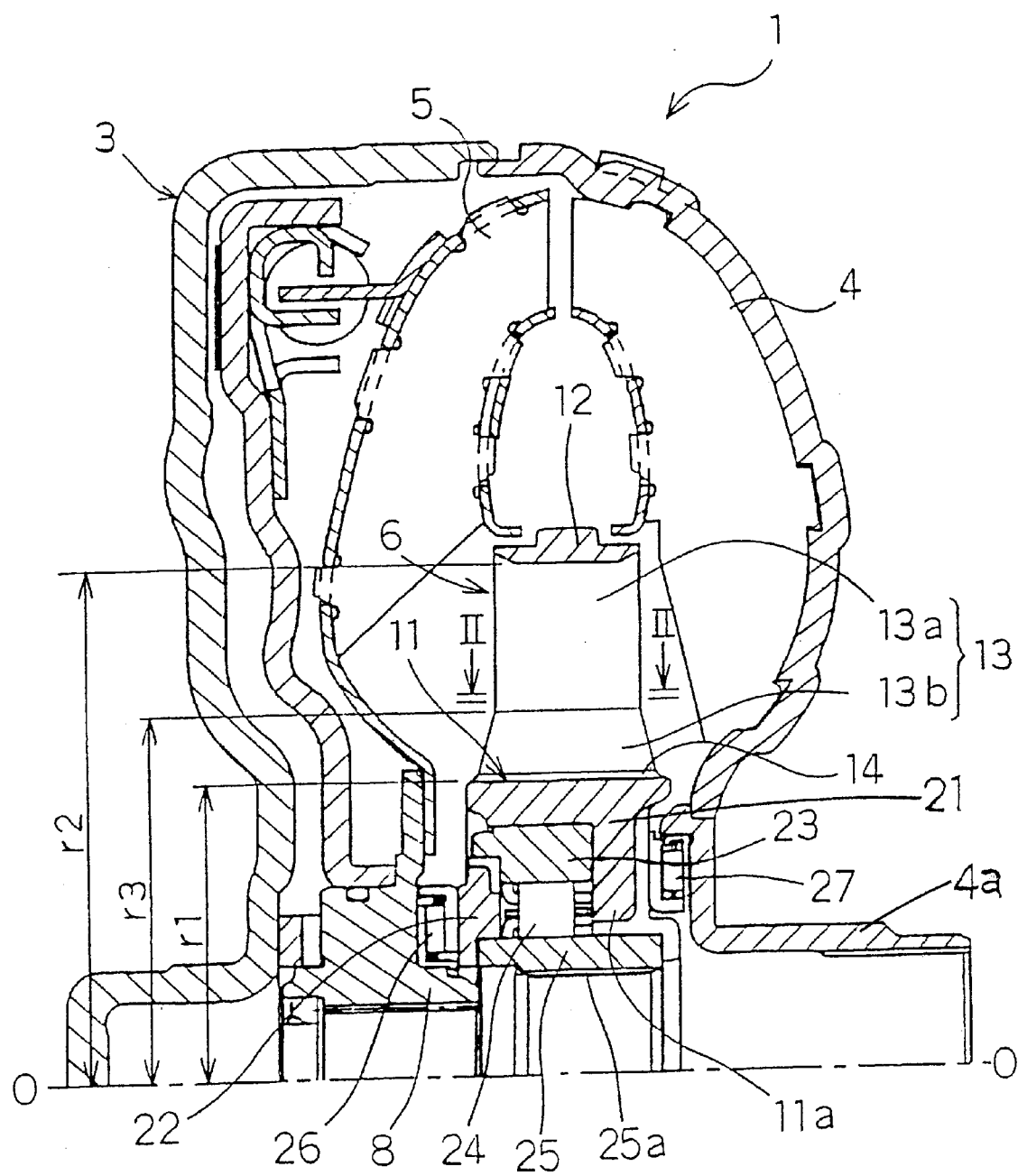
FIG. 1 is a fragmentary, cross section of a torque converter employing a stator according to one embodiment of the present invention.

FIG. 1 shows a torque converter 1 provided with a structure 6 according to an embodiment of the invention. In FIG. 1, 0—0 represents a rotation axis of the torque converter 1. An engine (not shown) is arranged on a left side of FIG. 1, and a transmission (not shown) is arranged on a right side of FIG. 1.

The torque converter 1 is basically a mechanism for transmitting a torque from a crank shaft of the engine to a main drive shaft of the transmission, and is formed of a front cover 3 having an outer peripheral portion coupled to the crank shaft, and a torque converter main unit formed of three vane wheels, i.e., an impeller 4, a turbine 5 and a stator 6. The front cover 3 and the impeller 4 are welded together at outer peripheral portions thereof, and define a working fluid chamber therebetween.

During operation of the torque converter, torque is applied from the crank shaft to the front cover 3 is output to the main drive shaft via the turbine 5 through the movement of working fluid flowing from the impeller 4 toward the turbine 5. When the engine starts, the working fluid circulated by the rotation of impeller 4 is moved toward the turbine 5. The working fluid thereafter moves toward the stator 6 in a direction that opposes the direction of rotation of the impeller 4. The stator 6 is formed with arcuate surfaces which redirect the flow of working fluid from the turbine 5 such that the working fluid flows in the direction that is generally the same direction as the rotating direction of the impeller 4, and thereby improves a torque transmission efficiency of the torque converter 1.

The stator 6 includes an annular inner shell 11, an annular outer shell 12 and a plurality of blades 13, which are integral with each other and are made of, for instance, a casting of aluminum alloy. Therefore, a corner portion 14 having a radius from about 1 mm to about 2 mm is formed as a boundary portion between each blade 13 and the inner shell 11.

The inner shell 11 is coupled to a stator shaft (not shown) that is fixed to the housing of the transmission via a stator support structure (described in greater detail below). The inner shell 11 has an outer diameter of (r1)×2. A thrust support 11a is formed at an inner peripheral portion of the inner shell 11.

The outer shell 12 is arranged radially outside the inner shell 11. The outer shell 12 has an inner diameter of (r2)×2. The blades 13 are formed between the inner shell 11 and the outer shell 12, and are arranged at a plurality of circumferentially spaced apart, aligned positions. Each blade 13 extends from the inner shell 11 to the outer shell 12 and thereby couples the outer peripheral portion of the inner shell 11 to the inner peripheral portion of the outer shell 12 together. Each blade 13 is formed with the corner portion 14, a first blade portion 13a and a second blade portion 13b. The second blade portion 13b extends from the corner portion 14 proximate the outer shell 12 and the first blade portion 13a extends from the second blade portion 13b to the outer shell 12.

Figure 2:
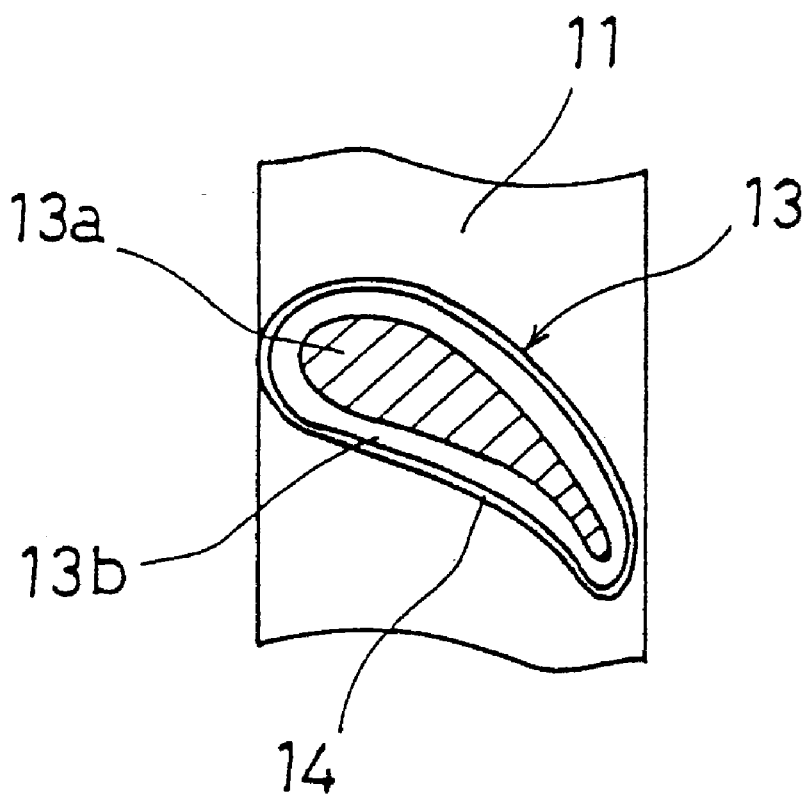
FIG. 2 is a cross section taken along line II—II in FIG. 1

A cross sectional area of the second blade portion 13b (i.e., an area of taken along a plane parallel to the center line 0—0) changes as one moves from the inner shell 11 toward the first blade portion 13a. The area of the cross section of the second blade portion 13b decreases as one moves from inner shell 11 toward the first blade portion 13a. A cross sectional areal of the first blade portion 13a also changes slightly as one moves from a position adjacent to the second blade portion 13b toward the outer shell 12 (for instance as one moves from the line r3 toward the line r2). However, as can be seen in FIG. 1, the dimensions of the first blade portion 13a do not change much as one moves radially outward from the line r3 toward the line r2, in particular since the cross sectional shape of the first blade portion 13a remains almost constant, as shown in FIG. 2. As can be seen in FIG. 1, as indicated in the side view, the rate of change in sectional area of the second blade portion 13b is different from the rate of change in sectional area of the first blade portion 13a as described above. The blade 13 has an increased cross sectional area at the vicinity of the inner shell 11, adjacent to the corner portion 14, when compared with the prior art structures where the change rate of the sectional area of a blade portion corresponding to the second blade 13b is equal to that of a blade portion corresponding to the first blade 13a of the present invention.

A boundary or position in the radial direction of the stator 6 between the first and second blade portions 13a and 13b is not a fixed location, but rather, in accordance with the present invention, is determined in consideration of both the demand for the performance and therefore the flow of the working fluid through the stator and the demand for the strength of the blade. Once the size of the stator has determined, the boundary is determined in consideration of the performance and the strength at a position spaced from the axis 0—0. In accordance with the present invention, the position of the boundary represented by the line r3 between the first and second blade portions 13a and 13b is in a range from 1/6 to 1/2 of the distance (r2−r1) plus the distance r1 between the outer peripheral portion of the inner shell 11 and the inner peripheral portion of the outer shell 12 and the size (r1) from the axis 0—0. In other words, the boundary defined by the line r3 should be a distance away from the axis 0—0 where the distance is defined between:

$$(1/6*(r2-r1))+r1 \geq r3 \geq (1/2*(r2-r1))+r1$$

In view of performance, it is more desirable that the boundary is located at a position toward the inner shell 11 away from the axis 0—0 by the following relationship;

$$r3=(1/3*(r2-r1))+r1$$

In view of the strength, it is more desirable that the boundary is closer to the outer shell 12, as follows:

$$r3=(1/4*(r2-r1))+r1$$

In view of the forms and sizes of the impeller 4, turbine 5 and stator 6, the boundary between the first and second blade portions 13a and 13b in the depicted embodiment is determined at a position spaced from the shaft 0—0 represented by the line r3 as follows:

$$r3=(1/3*(r2-r1))+r1$$

Therefore, the change rate of the sectional area of the blade 13 changes at the boundary position represented by the line r3.

Generally, it is required in the stator of the torque converter to reduce the thickness of the blade in view of the performance, but it is also required to increase the thickness of the blade in view of the strength. In order to satisfy these contradictory requirements, the stator 6 of the present invention is such that the structure of the first blade portion 13a of the blade 13 extending from the outer shell 12 to the line r3 has desired reduced thickness and the second blade portion 13b extending from the line r3 to the inner shell 11 has an increased sectional area satisfying structural requirements for strength. Therefore, performance is achieved primarily by the thin first blade portion 13a, and required strength is ensured primarily by the second blade portion 13b having an increased cross sectional area. Compared with the conventional prior art structure employing the stator having a blades with a cross sectional area which changes at a substantially constant rate, the embodiments of the present invention can increase ranges and configurations in which the performance of the stator 6 can be optimized, and therefore can improve the performance of the torque converter 1 while maintaining an intended strength of the stator 6.

The stator support structure will now be described below.

The stator support structure is formed of a one-way clutch mechanism 21 and an annular retainer 22. The one-way clutch mechanism 21 allows rotation of the stator 6 only in one direction, and is formed of an outer race 23, an inner race 25 and a clutch member 24 disposed between these races. The outer race 23 is fixed to the inner peripheral portion of the inner shell 11. The sides of the outer and inner races 23 and 25 near the engine are in contact with a retainer 22, which is supported by a turbine hub 8 through a thrust roller bearing 26. The turbine hub 8 is fixed to the inner peripheral portion of the turbine 5. The other sides of the outer and inner races 23 and 25 adjacent to the transmission are in contact with a thrust support 11a of the inner shell 11, which is supported by an impeller hub 4a through a thrust roller bearing 27. Impeller hub 4a is fixed to an inner periphery of the impeller 4. In this manner, a movement of the inner shell 11 of the stator 6 and the stator support structure along the axis 0—0 is restricted between the impeller hub 4a and the turbine hub 8 by the thrust roller bearings 26 and 27. The inner race 25 is provided at its inner periphery with a spline aperture 25a engaged to a stator shaft (not shown).

According to the invention, the blade portion between the inner shell and the intermediate position of the blade can be thin primarily in view of the performance, and the blade portion between the intermediate position and the outer shell can have a large sectional area for satisfying the requirement for the strength. Therefore, the blade thickness can be reduced while maintaining the strength, and the performance of the stator of the torque converter and therefore the performance of the torque converter can be improved.

As can be seen in FIG. 2, the cross sectional area of the first blade portion 13a is smaller than the cross sectional area of the second blade portion 13b proximate the inner shell 11. Going from the inner shell 11 toward the boundary defined by the line r3, the cross sectional area of second blade portion 13b decreases until, at the boundary, the cross sectional area of the second blade portion 13b is generally equal to the cross sectional area of the first blade portion 13a.

It should be appreciated that the cross sectional area of the first blade portion 13a, as depicted, hardly changes going from the boundary (r3) toward the outer shell 12. Depending on the desired performance of the torque convertor, the cross sectional area of the first blade portion 13a may be generally constant or may gradually decrease from the boundary toward the outer shell 12.

Various details of the present invention may be changed without departing from its spirit or its scope. Furthermore, the foregoing description of the embodiments according to the present invention are provided for illustration only, and not for the purpose of limiting the invention as defined by the appended claims and their equivalents.

What is claimed is:

1. A stator of a torque converter comprising:
   an annular inner shell;
   an annular outer shell disposed radially outside said inner shell; and
   a plurality of blades extending between said outer shell and said inner shell, said blades being disposed about said inner shell at circumferentially spaced apart positions, said blades coupling an outer peripheral portion of said inner shell and an inner peripheral portion of said outer shell together, each of said blades being formed with an inner portion and an outer portion in a radial direction relative to said inner shell and said outer shell, wherein a rate of change in the cross sectional area of said inner and outer portions is such that the rate of change in the cross sectional area of said inner portion differs from the rate of change in the cross sectional of said outer portion, and a boundary between said inner portion and said outer portion is defined at a radial position relative to said outer peripheral portion of said inner shell by a distance that is in a range of from ⅙ to ½ of a distance between said outer peripheral portion of said inner shell and said inner peripheral portion of said outer shell, and the cross sectional area of said inner portion of each of said blades proximate said outer peripheral portion of said inner shell is larger than the cross sectional area of said outer portion of said blades proximate said boundary, and each of said blades is formed with a corner portion having a predetermined radius thereby forming a boundary between said blades and said inner shell.

2. The stator of a torque converter according to claim 1, wherein
   said boundary at a position between said inner portion and said outer portion at a radial position relative to said outer peripheral portion of said inner shell by a distance that is ⅓ the distance between said outer peripheral portion of said inner shell and said inner peripheral portion of said outer shell.

3. The stator of a torque converter according to claim 1, wherein
   said boundary at a position between said inner portion and said outer portion at a radial position relative to said outer peripheral portion of said inner shell by a distance that is ¼ the distance between said outer peripheral portion of said inner shell and said inner peripheral portion of said outer shell.

4. The stator of a torque converter according to claim 1, wherein
   the cross sectional area of said outer portion of said blades is generally constant throughout a radial length thereof.

5. The stator of a torque converter according to claim 1, wherein
   the cross sectional area of said outer portion of said blades decreases gradually going from said boundary toward said outer shell.

6. The stator of a torque converter according to claim 1, wherein
   the cross sectional area of said inner portion of said blades at said boundary is generally the same as the cross sectional area of said outer portion at said boundary.

7. The stator of a torque converter according to claim 1, wherein
   said boundary at a position between said inner portion and said outer portion at a radial position relative to said outer peripheral portion of said inner shell by a distance that is between ⅙ and ⅓ the distance between said outer peripheral portion of said inner shell and said inner peripheral portion of said outer shell.

8. The stator of a torque converter according to claim 1, wherein
   said boundary at a position between said inner portion and said outer portion at a radial position relative to said outer peripheral portion of said inner shell by a distance that is between ¼ and ½ the distance between said outer peripheral portion of said inner shell and said inner peripheral portion of said outer shell.

9. The stator as set forth in claim 1, where in said corner portion has a radius from about 1 mm to about 2 mm.

10. A stator of a torque converter comprising:

an annular inner shell;

an annular outer shell disposed radially outside said inner shell; and a plurality of blades extending between said outer shell and said inner shell, said blades being disposed about said inner shell at circumferentially spaced apart positions, said blades coupling an outer peripheral portion of said inner shell and an inner peripheral portion of said outer shell together, each of said blades being formed with an inner portion and an outer portion in a radial direction relative to said inner shell and said outer shell, and each of said blades is formed with a corner portion having a predetermined radius thereby forming a boundary between said blades and said inner shell.

11. The stator as set forth in claim 10, where in said corner portion has a radius from about 1 mm to about 2 mm.

12. The stator as set forth in claim 10, wherein a rate of change in the cross sectional area of said inner and outer portions is such that the rate of change in the cross sectional area of said inner portion differs from the rate of change in the cross sectional of said outer portion, and a boundary between said inner portion and said outer portion is defined at a radial position relative to said outer peripheral portion of said inner shell by a distance that is in a range of from $1/6$ to $1/2$ of a distance between said outer peripheral portion of said inner shell and said inner peripheral portion of said outer shell, and the cross sectional area of said inner portion of each of said blades proximate said outer peripheral portion of said inner shell is larger than the cross sectional area of said outer portion of said blades proximate said boundary.

13. The stator of a torque converter according to claim 10, wherein said boundary at a position between said inner portion and said outer portion at a radial position relative to said outer peripheral portion of said inner shell by a distance that is $1/3$ the distance between said outer peripheral portion of said inner shell and said inner peripheral portion of said outer shell.

14. The stator of a torque converter according to claim 10, wherein said boundary at a position between said inner portion and said outer portion at a radial position relative to said outer peripheral portion of said inner shell by a distance that is $1/4$ the distance between said outer peripheral portion of said inner shell and said inner peripheral portion of said outer shell.

15. The stator of a torque converter according to claim 10, wherein the cross sectional area of said outer portion of said blades is generally constant throughout a radial length thereof.

16. The slator of a torque convertor according to claim 10, wherein the cross sectional area of said outer portion of said blades decreases gradually going from said boundary toward said outer shell.

17. The stator of a torque convertcr according to claim 10, wherein the cross sectional area of said inner portion of said blades at said boundary is generally the same as the cross sectional area of said outer portion at said boundary.

18. The stator of a torque converter according to claim 10, wherein said boundary at a position between said inner portion and said outer portion at a radial position relative to said outer peripheral portion of said inner shell by a distance that is between $1/6$ and $1/3$ the distance between said outer peripheral portion of said inner shell and said inner peripheral portion of said outer shell.

19. The stator of a torque converter according to claim 10, wherein said boundary at a position between said inner portion and said outer portion at a radial position relative to said outer peripheral portion of said inner shell by a distance that is between $1/4$ and $1/2$ the distance between said outer peripheral portion of said inner shell and said inner peripheral portion of said outer shell.

\* \* \* \* \*